United States Patent Office.

SIMON STEVENS, OF NEW YORK, N. Y.

Letters Patent No. 68,321, dated August 27, 1867.

IMPROVEMENT IN THE PRODUCTION AND MANUFACTURE OF CARBONIC ACID, AND IN THE APPLICATION OF THE SAME FOR VARIOUS USEFUL PURPOSES.

The Schedule referred to in these Letters Patent and making part of the same.

TO ALL WHOM IT MAY CONCERN:

Be it known that I, SIMON STEVENS, of the city, county, and State of New York, have made a new and useful Improvement in the Production and Manufacture of Carbonic Acid, and in the application of the same to various useful purposes; and I hereby declare the following to be a full and exact description thereof.

This invention consists in the production of carbonic acid by the combustion of petroleum and other hydrocarbon liquids, in the form of spray or mist mixed with air, or with air and steam, so as to produce a perfect combustion of the hydrocarbon, and generate carbonic acid free from soot, ashes, and noxious gases, to be used for the manufacture of white lead; for carbonating alkalies in the manufacture of saleratus, carbonate and bicarbonate of soda; for aerating water and other liquids in the manufacture of soda-water, mineral-waters, and other effervescing beverages and liquids; for the manufacture of aerated bread; for the preparation of liquid and solid carbonic acid, for the manufacture of ice, for cooling, refrigerating, and other like purposes; for generating condensed carbonic acid for use in producing motive power; for the recovery of alkalies in the waste liquids of paper-works; for the preserving of fruits and vegetables, and for all uses to which carbonic acid is applicable.

Heretofore, four modes of generating carbonic acid have been employed in the arts, viz: first, by decomposing a carbonate by means of a stronger acid; second, by subjecting organic matter to the vinous fermentation; third, by the decomposition of limestone or an alkali by heat, or by heat aided by steam; and, fourth, by the combustion of coal, wood, or other carbonaceous matter, either in the solid, liquid, or gaseous condition. The last-mentioned mode is by far the cheapest, and would be generally adopted but for the difficulty of obtaining the carbonic acid free from admixture with noxious products.

The object of my invention is to produce, by the combustion of liquid hydrocarbon, carbonic acid sufficiently free from admixture with foreign substance to be used for the various purposes above indicated, and this I accomplish by projecting the liquid hydrocarbon in the form of spray, mixed with air or with air and steam, into a combustion-chamber.

The spray may be formed by any of the devices known as "atomizers," and a jet of steam, a jet of air, or a combined jet of steam and air, may be used as the means for "atomizing" the hydrocarbon liquid. It is not necessary to describe the devices called "atomizers" for producing spray from liquids, since they are well known and described. I prefer to use a steam-jet as the means of atomizing, since the addition of steam to the mixture of hydrocarbon, spray, and air is of material advantage in aiding combustion and in forming pure carbonic acid. Instead of using steam as the atomizing agent an air-jet may be used, but in that case it would be well to throw in a spray of water to mingle with the spray of hydrocarbon, and assist in effecting more perfect combustion. After the combustion of the hydrocarbon, the further treatment of the carbonic acid will depend upon the use to which it is to be applied. If it is to be used in the manufacture of white lead, it needs no further treatment after sufficient time to cool. When the combustion has been effected by atmospheric air, the carbonic acid will be mixed with nitrogen gas. This, for many purposes, will not be injurious. But when it is desirable to have pure carbonic acid, free from nitrogen, either of the two following plans may be adopted: first, by cooling and condensing the carbonic acid gas in contact with water it will be absorbed in large quantity, and in that way will be separated from nitrogen. This plan has been used in the manufacture of liquid carbonic acid, and in the manufacture of soda-water, mineral-waters, and the like, from carbonic acid generated by combustion of wood and coal. The other plan is to use oxygen gas to effect combustion, and in that case pure carbonic acid will result, which may be used either in the gaseous, liquid, or solid state, as may be desirable.

The apparatus for compressing, cooling, liquefying, and solidifying carbonic acid being well known, need not be particularly described.

It is evident that during the combustion of the hydrocarbon liquid to form carbonic acid a large amount of heat will be produced. This may be employed for heating, generating steam, and any other object to which heat is to be applied. The mixture of hydrocarbon spray and air, or hydrocarbon spray, air, and steam, or the mixture of combined spray of hydrocarbon and water, may be used as the gaseous compound for operating what are known as gas engines, and common hot-air engines may be converted into gas engines by using the mixture of spray and air in the cylinder instead of air. The mixture, by being burned in the cylinder at the proper time, will develop a large power or force. When used in gas engines, the mixture of spray and air may be ignited by the devices now employed for igniting the mixture of gas and air. Carbonic acid produced by my process may be condensed in strong vessels, and used for producing motive power in the same manner that carbonic acid is now used.

Having described my invention, what I claim and desire to secure by Letters Patent of the United States, is—

1. The process of preparing carbonic acid herein described.

2. The use of carbonic acid prepared in the manner herein described for the improvement of the several processes and manufacture herein specified.

3. The compound formed by mixing hydrocarbon spray with air, or air and steam, for producing motive power in gas and other engines, substantially as herein set forth.

SIMON STEVENS.

Witnesses:
    JOSEPH BECSEY,
    GEO. F. LELAND.